United States Patent
Tanzer et al.

(10) Patent No.: US 6,926,785 B2
(45) Date of Patent: Aug. 9, 2005

(54) LOW EMISSIVITY PRODUCTS AND METHODS FOR MAKING SAME

(75) Inventors: Jay Tanzer, Clackamas, OR (US); David C. Ritter, West Linn, OR (US)

(73) Assignee: Louisiana Pacific Corporation, Portland, OR (US)

( * ) Notice: Subject to any disclaimer, the term of this patent is extended or adjusted under 35 U.S.C. 154(b) by 28 days.

(21) Appl. No.: 10/447,681

(22) Filed: May 28, 2003

(65) Prior Publication Data

US 2004/0020581 A1 Feb. 5, 2004

Related U.S. Application Data

(60) Provisional application No. 60/386,598, filed on Jun. 5, 2002.

(51) Int. Cl.[7] .............................. B32B 31/00; E04D 3/35
(52) U.S. Cl. .......................... 156/87; 156/252; 156/253; 156/264; 156/307.3; 156/307.4; 156/307.7; 156/51.3; 156/514; 156/516; 156/517; 156/521; 52/408; 52/409; 52/411
(58) Field of Search ............................... 156/264, 307.3, 156/307.4, 307.7, 516, 521, 87, 86, 252, 253, 270, 513, 514, 517, 519; 52/408, 409, 411

(56) References Cited

U.S. PATENT DOCUMENTS

| | | | |
|---|---|---|---|
| 3,560,297 A | * | 2/1971 | Back et al. ............... 156/309.9 |
| 4,879,083 A | | 11/1989 | Knudson et al. |
| 5,231,814 A | | 8/1993 | Hageman |
| 6,251,495 B1 | | 6/2001 | Wilson et al. |
| 6,772,569 B2 | * | 8/2004 | Bennett et al. ............ 52/592.1 |

OTHER PUBLICATIONS

Grace; "Review of Recent Research on the Use of Borates for Termite Prevention"; *The Second International Conference on Wood Protection With Diffusible Preservatives and Pesticides, Forest Products Society*; pp 85–92 (1996).

Lee, et al.; "The Influence of Flake Chemical Properties and Zinc Borate on Gel Time Of Phenolic Resin for Oriented Strandboard"; *Wood and Filter Science* 33(3); pp. 425–436 (2001).

Sean, et al.; "Protection of Oriented Strandboard with Borate"; *Forest Products Journal*; vol. 49, No. 6; pp. 47–51 (1998).

(Continued)

*Primary Examiner*—Linda Gray
(74) *Attorney, Agent, or Firm*—Marger Johnson & McCollom, P.C.

(57) ABSTRACT

The method of this invention adheres a low emissivity radiant barrier material to an underlying lignocellulosic substrate within the primary manufacturing operation of the underlying lignocellulosic substrate. Thus, a radiant barrier covered substrate is formed by integrally joining the radiant barrier covering to a mat of lignocellulosic material during consolidation thereof with a first adhesive bonding material to form an underlying substrate. The integral joining operation can, for example, be accomplished by bonding the radiant barrier covering to a lignocellulosic mat in a product formation press. This is typically accomplished using a second adhesive bonding material for adhesion of the radiant barrier material to the lignocellulosic mat, and a first adhesive bonding material for consolidating the lignocellulosic mat to form a lignocellulosic substrate. More specifically, this invention is directed to a method whereby a low emissivity radiant barrier material is joined in situ to a mat of lignocellulosic particles using a second adhesive material, during the consolidation of the lignocellulosic particles and a first adhesive bonding material to form an underlying substrate, an integral laminated radiant barrier covered lignocellulosic product being produced.

19 Claims, 5 Drawing Sheets

OTHER PUBLICATIONS

Laks, et al.; "The Effects of Sodium Octaborate Tetrahydrate and Zinc Borate on the Properties of Isocyanate–Bonded Waferboard"; *Proceedings of the Annual Meeting Of the American Wood Preservation Association*; vol. 88; pp 1–20 (May 1992).

Laks, et al.; "Update on the Use of Borates as Preservatives for Wood Composites"; *The Second International Conference on Wood Protection With Diffusible Preservatives and Pesticides, Forest Products Society*; pp. 62–68 (1996).

* cited by examiner

LOW EMISSIVITY PRODUCTS AND METHODS FOR MAKING SAME

RELATED APPLICATION DATA

This application claims priority from U.S. Provisional Application Ser. No. 60/386,598, filed Jun. 5, 2002 incorporated by reference herein.

BACKGROUND OF THE INVENTION

This invention relates to products having a low degree of emissivity, and to methods for producing same, and in particular to low emissivity products which also exhibit a high level of moisture vapor permeability.

As pointed out in U.S. Pat. No. 5,231,814 ("US '814") and in U.S. Pat. No. 6,251,495 ("US '495"), both of which are incorporated herein in its entirety by reference, and both of which are owned by the assignee of this patent application, roof decking typically is formed of structural wood products, such as plywood or oriented strand board ("OSB"). These structural wood products are attached to the structural members of a house by nails or other fastening means. This roof decking defines the confines of the roof of the house and serves as the substrate for joining the outer protective water-shedding materials, i.e., the tar paper and shingles, which are attached thereto and complete the protective roof assembly.

This roof structure is formed of materials which inherently have minimal thermal insulating and emissivity barrier properties. Therefore, heat transfer through the roof structure from the outdoors to the interior space of, for example, a home, particularly during the summer months, is a problem to homeowner. Either the homeowner undergoes severe discomfort due to elevated temperatures inside the house, or they must pay a high price for installing and operating air conditioning. Prior to the product described in US '814, the insulative solar or heat emitting properties of a structural roof have undergone limited improvements such as by applying insulative materials to the exterior of the roof decking under the outer protective materials.

Excess heat transfer is generated on a daily basis in the summer months, which penetrates into the interstices of building materials such as sheet rock and insulation causing unwanted elevated temperatures within the interior living space. Thus, under conventional home construction conditions, the air temperature in attics and ceilings can be raised to about 140 degrees F. or higher. US '814 addresses certain problems relating to heat transfer. In US '814, a roof structure is fitted with roof decking comprising a substrate of plywood or OSB with a layer of a radiant barrier material adhered thereto. In preferred form of this invention of US '814, the radiant barrier material is subsequently adhered to substrate in a secondary formation sequence. The radiant barrier material comprises a layer of metallic foil such as an aluminum foil material. The foil covered roof decking material is fastened to the rafters in a typical roof structure.

The radiant barrier material used in US '814 includes a plurality of substantially uniformly distributed perforations which are introduced therein prior to applying same to a preformed underlying substrate. When the perforated foil material is applied in a secondary application, this process is conducted under ambient temperature.

The expressed reason for introducing the perforations into the foil material is to permit the passage of moisture between the moisture barrier layer and the roof. In this way, it is thought that a significant portion of excess moisture can be released through the perforations located in the foil material thereby permitting the roof decking to "breathe." If a significant portion of the excess moisture is not released, unwanted degradation of the substrate can result. Moisture can be present due to, for example, water vapor which enters the house during construction (before the roof is put on), or after construction from roof leaks of various types. Unwanted moisture can also result from the cumulative effect of vapor condensation.

Typically, the decking is placed in position with the foil layer facing inwardly toward the attic of the house. The low emissivity foil faces at least one adjacent air space (the attic) to prevent unwanted heat transfer.

US '495 is also directed to a radiant barrier covered product. The product of US '495 can be formed by adhering a radiant barrier layer to a preformed underlying substrate in a secondary application operation. The underlying substrate can be formed of a variety of materials such wood or wood substrate products, or mineral or polymeric substrate products. The underlying substrate is most preferably formed of a structural wood panel such as OSB, plywood or the like.

A plurality of apertures are then introduced into the radiant barrier material covered product so that these apertures extend substantially completely through the radiant barrier material, substantially completely through any intermediate layer such as paper or the like, as well as substantially completely through the adhesive material, thereby forming substantially completely open moisture vapor flow channels. The apertures also extend through at least one of the outer major surfaces of the underlying substrate. A portion of the radiant barrier material is typically moved into the confines of the apertures, and the radiant barrier material portion is maintained therein without picking a substantial amount of the radiant barrier material portion from within the confines of the apertures.

SUMMARY OF THE INVENTION

US '814 and in US '495 can relate to a low emissivity foil material which is adhered to a preformed underlying substrate in a secondary manufacturing operation to form a low emissivity product having a high level of vapor permeability that enables trapped excess moisture to be transported from the product to the surrounding atmosphere. If a secondary manufacturing operation is employed in US '814 and/or US '495, substantial additional manufacturing equipment would be employed for use in thereafter applying a low emissivity radiant barrier material to a preformed underlying substrate. This results in (a) a considerable additional cost for the purchase and operation of the foil material application equipment, (b) significant additional product formation time and associated higher manufacturing costs, and (c) reduced efficiencies involved in manufacturing a product which requires a post foil covering line which adheres the radiant barrier material to the performed underlying substrate.

Contrarily, the method of the present invention requires a substantial lesser amount of equipment and considerably fewer manufacturing steps in the in situ forming of a low emissivity foil material covered laminate substrate product. Employing the method of the present invention to form the subject radiant barrier material covered laminate substrate product results in (a) a considerable cost savings relating to the costs of purchase and operation of the radiant barrier material application equipment, (b) a significant reduction in product formation time and a lowering of associated manufacturing costs, and (c) increased overall cost efficiencies due to the elimination of the additional post radiant barrier covering manufacturing line which are presently employed to adhere the radiant barrier material to the preformed underlying substrate. In addition, it is believed that the radiant barrier material covered laminate substrate product will exhibit an increased level of durability as compared to prior art non-laminate radiant barrier material covered products.

The method of this invention adheres a low emissivity radiant barrier material to an underlying lignocellulosic substrate within the primary manufacturing operation of the underlying lignocellulosic substrate. Thus, a radiant barrier covered substrate is formed by integrally joining the radiant barrier covering to a mat of lignocellulosic material during consolidation thereof with a first adhesive bonding material to form an underlying substrate. The integral joining operation can, for example, be accomplished by bonding the radiant barrier covering to a lignocellulosic mat in a product formation press. This is typically accomplished using a second adhesive bonding material for adhesion of the radiant barrier material to the lignocellulosic mat, and a first adhesive bonding material for consolidating the lignocellulosic mat to form a lignocellulosic substrate. More specifically, this invention is directed to a method whereby a low emissivity radiant barrier material is joined in situ to a mat of lignocellulosic particles using a second adhesive material to adhere the radiant barrier material to the lignocellulosic mat and a first adhesive bonding material to form an underlying substrate, an integral laminated radiant barrier covered lignocellulosic product being produced. Thus, a method of this invention is provided for producing an integral laminated lignocellulosic product which exhibits (a) a low level of emissivity and (b) a high level of moisture vapor permeability, and which enables trapped excess moisture to be transported from the product to the surrounding atmosphere While maintaining its effective radiant barrier properties.

The subject method preferably comprises providing a plurality of layers of lignocellulosic material, and then forming a mat of this plurality of layers of lignocellulosic material. Preferably, the lignocellulosic material comprises lignocellulosic particles or lignocellulosic veneers. The lignocellulosic mat is consolidated to form a lignocellulosic substrate. The lignocellulosic substrate preferably comprises a structural substrate.

The mat of lignocellulosic material is preferably bonded together with a first adhesive bonding material in the form of a thermosetting resin which typically comprises an aldehyde resin and/or an isocyanate resin as hereinafter described in more detail herein. The resins which are most often employed commercially are MDI, phenol-formaldehyde, or urea-formaldehyde. Furthermore, the adhesive bonding material preferably comprises a liquid or a powder.

Next, the mat of lignocellulosic material and/or the radiant barrier material has a second adhesive bonding material applied thereto. The second adhesive bonding material can be added to a surface layer of the plurality of layers of lignocellulosic material to which the radiant barrier material will be applied, and/or directly to the radiant barrier material itself. The second adhesive bonding material is applied prior to the consolidation of a lignocellulosic mat to form a lignocellulosic substrate. The adhesive bonding material preferably comprises at least one of a thermosetting resin such as an isocyanate polymer, an aldehyde resin, an aldehyde resin-latex copolymer, or an isocyanate resin-latex copolymer, or a hot-melt type such as a polyolefin, a polyester, a vinyl acetate polymer, or a styrene-butadiene copolymer. Furthermore, the adhesive bonding material preferably comprises a liquid or a powder. The first adhesive bonding material and the second adhesive bonding material can comprise either the same adhesive bonding material or a different adhesive bonding material, respectively.

A radiant barrier material is also provided. The radiant barrier material is typically a foil material, preferably a metallic foil material, and more preferably an aluminum foil material. The foil material may be metal alone, or more preferably it may be metal pre-laminated to a supporting substrate such as paper or a polymeric film.

The radiant barrier material is applied with a second adhesive material to an outer surface of the mat of lignocellulosic material to form a radiant barrier material covered mat of lignocellulosic material. This can be accomplished as part of an integrated formation operation. Thus, the formation process of the present invention can be conducted by bonding together in situ the mat of lignocellulosic material with the first adhesive bonding material. It also includes bonding together the radiant barrier material to the mat of lignocellulosic material with the second adhesive bonding material. In this way, an integral laminated radiant barrier material covered lignocellulosic substrate is formed, without using a preformed lignocellulosic substrate to produce the integral laminated product. By employing an integrated formation sequence, a secondary manufacturing operation is not employed in the production of the low emissivity product of this invention.

The integrated formation operation typically employs a hot press operation to consolidate and bond in situ the mat of lignocellulosic material and the radiant barrier material with the second adhesive bonding material, as well as the mat of lignocellulosic material with the first adhesive bonding material, to form the integrated lignocellulosic laminate product of this invention. In the preferred subject process of the present invention, the radiant barrier material is applied directly to an outer surface of the mat of lignocellulosic material prior to introducing same into an open hot press. The press is then closed and the mat of lignocellulosic material and first adhesive material are consolidated in situ employing a hot pressing process which additionally joins the radiant barrier material to the lignocellulosic substrate using the second adhesive material. The integrated lignocellulosic laminate product which exits the hot press upon completion of the formation operation comprises a radiant barrier material which is joined to the outer surface of the in situ formed lignocellulosic substrate so that an integral radiant barrier material covered lignocellulosic laminate product structure is provided.

The components of the adhesive bonding material should flow and stabilize and cure based on a predetermined temperature range. Thus, this bonding step is preferably conducted at a temperature of at least about 140 degrees C., more preferably at a temperature of at least about 170 degrees C., and most preferably conducted at a temperature of at least about 200 degrees C. The bonding step is preferably conducted at a pressure of at least about 200 psi, more preferably at a pressure of at least about 400 psi, and most preferably at a pressure of at least about 600 psi.

A plurality of apertures are introduced into said radiant barrier material prior to and/or subsequent to the formation of said radiant barrier material covered mat of treated lignocellulosic material. If the plurality of apertures are to be introduced into said radiant barrier material prior to the formation of the radiant barrier material covered mat of treated-lignocellulosic material, it is usually accomplished by employing a pre-perforated radiant barrier material in the method of the present invention. If the plurality of apertures are to be introduced into said radiant barrier material subsequent to the formation of the radiant barrier material covered mat of treated lignocellulosic material, it is usually accomplished by introducing a plurality of apertures into the laminated radiant barrier material covered substrate thereby forming the permeable integral laminated product. In the case where the apertures are introduced into said radiant barrier material by pre-perforation thereof, for example, it may be a useful option to prevent blistering of the radiant barrier material which can sometimes result from excessive internal gas pressure buildup during hot pressing.

These apertures preferably extend substantially completely through both the radiant barrier material and the adhesive material thereby forming substantially completely open moisture vapor flow channels which create a high level of moisture vapor permeability through the radiant barrier material and the adhesive material thereby permitting a substantial amount of trapped excess moisture to pass from the underlying substrate into the surrounding atmosphere to avoid unwanted degradation of the underlying substrate, while maintaining the low level of emissivity of the product. The apertures are formed by the step of perforating the radiant barrier material covered product. Preferably, the apertures are shaped in a substantially non-circular pattern. Furthermore, the amount of the radiant barrier material which is removed from the product can be minimized during forming of the apertures thereby maintaining the low level of emissivity of the product. In a preferred form of this invention, the plurality of apertures is introduced into the radiant barrier material by moving a portion of the radiant barrier material over the apertures, or within the confines of the apertures, for facilitating the low level of emissivity of the product. In another preferred form of this invention, the plurality of apertures are introduced into the radiant barrier material by moving a portion of the radiant barrier material into the confines of the apertures and maintaining the radiant barrier material portion therein without picking a substantial amount of the radiant barrier material portion from within the confines of the apertures for facilitating the low level of emissivity of the product. The product of the present invention is preferably formed by introducing a plurality of apertures into the radiant barrier material covered product so that the apertures extend substantially completely through the radiant barrier material, substantially completely through any intermediate layer such as paper or the like, as well as substantially completely through the adhesive material, thereby forming substantially completely open moisture vapor flow channels.

The product of this invention exhibits a combination of a high level of moisture vapor permeability, on the one hand, and on the other hand, excellent emissivity properties that emulate those of the prior art US '814 structures. Stated another way, a maximum amount of moisture can be released from the product of the present invention, while at the same time the desirable low emissivity effect of the barrier layer material can be maintained. Thus, the products of the subject invention exhibit an optimum combination of low emissivity and a high level of moisture vapor permeability which causes excess moisture to be transported to the surrounding atmosphere from the product.

Moreover, the emissivity of the structural composite product formed by the subject invention is generally maintained at a relatively low level in spite of the fact that apertures have been introduced into the radiant barrier layer. Thus, the average emissivity of the composite product of the present invention is preferably not more than about 0.05, more preferably not more than about 0.045, and most preferably not more than about 0.04.

The foregoing and other objects, features and advantages of the invention will become more readily apparent from the following detailed description of a preferred embodiment of the invention which proceeds with reference to the accompanying drawings.

DETAILED DESCRIPTION OF AN EXEMPLARY EMBODIMENT

Figure 1:
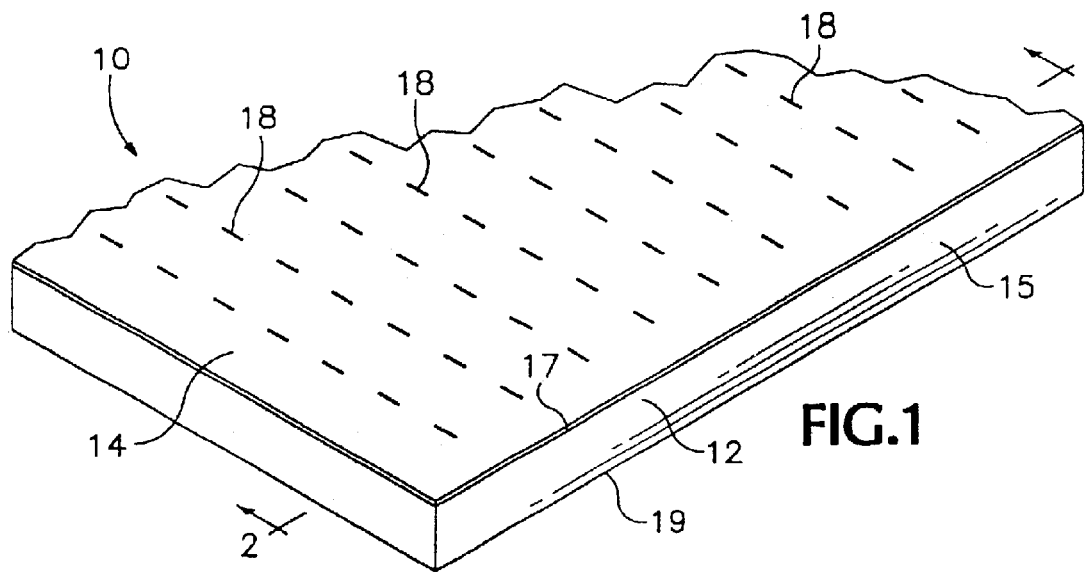
FIG. 1 is a perspective schematic view of a preferred product of this invention having a preferred aperture pattern.

According to the present invention, lignocellulosic material is provided and a mat of these lignocellulosic material is then formed. The mat preferably comprises a plurality of layers of lignocellulosic material which produce a multi-layer product.

The lignocellulosic mat of this invention can be prepared by application of a first adhesive bonding material to lignocellulosic particles, chips or fibers, specifically wood particles, wood chips and lignocellulosic fibers, can be formed into layers. Also, instead of first forming a layer by bonding together lignocellulosic particles or the like, layers or sheets of lignocellulosic material, such as veneer layers or sheets or the like, can be provided and used to form the subject lignocellulosic mat. Mixtures of lignocellulosic particles may also be used. Typically, such materials are wood particles derived from wood and wood residues such as wood chips, wood fibers, shavings, veneers, wood wool, cork, bark, sawdust, and the like. Particles of other lignocellulosic material such as shredded paper, pulp or vegetable fibers such as corn stalks, straw, bagasse and the like may also be used.

The first adhesive bonding material is typically blended with the above lignocellulosic materials so that thorough mixing and dispensing of the adhesives is achieved. The first adhesive bonding material of the present invention generally comprises a thermosetting resin such as an isocyanate polymer and/or an aldehyde polymer resin. The polymers which form the adhesive bonding material are typically in liquid or powder form so that they can be applied directly to a surface of a layer of lignocellulosic material. The polymer resins can be combined together prior to their application.

The aldehyde polymer resins can comprise thermosetting resins such as phenol-formaldehyde, resorcinol-formaldehyde, melamine-formaldehyde, urea-formaldehyde, modified lignosulfonates, urea-furfural and condensed furfuryl alcohol resins. The phenolic component can include any one or more of the phenols which have heretofore been employed in the formation of phenolic resins and which are not substituted at either the two ortho-positions or at one ortho- and the para-position, such unsubstituted positions being necessary for the polymerization reaction. Any one, all, or none of the remaining carbon atoms of the phenol ring can be substituted. The nature of the substituent can vary widely, and it is only necessary that the substituent not interfere in the polymerization of the aldehyde with the phenol at the ortho- and/or para-positions. Substituted phenols employed in the formation of the phenolic resins include: alkyl-substituted phenols, aryl-substituted phenols, cyclo-alkyl-substituted phenols, alkenyl-substituted phenols, alkoxy-substituted phenols, aryloxy-substituted phenols, and halogen-substituted phenols, the foregoing substituents containing from 1 to 26 and preferably from 1 to 12 carbon atoms. Specific examples of suitable phenols include: phenol, 2,6 xylenol, o-cresol, m-cresol, p-cresol, 3,5-xylenol, 3-4-xylenol, 2,3,4-trimethyl phenol, 3-ethyl phenol, 3,5-diethyl phenol, p-butyl phenol, 3,5-dibutyl phenol, p-amyl phenol, p-cyclohexyl phenol, p-octyl phenol, 3,5-dicyclohexyl phenol, p-phenyl phenol, p-crotyl phenol, 3,5-dimethoxy phenol, 3,4,5-trimethoxy phenol, p-ethoxy phenol, p-butoxy phenol, 3-methyl-4-methoxy phenol, and p-phenoxy phenol.

The aldehydes reacted with the phenol can include any of the aldehydes heretofore employed in the formation of phenolic resins such as formaldehyde, acetaldehyde, propionaldehyde, furfuraldehyde, and benzaldehyde. In general, the aldehydes employed have the formula R'CHO wherein R' is a hydrogen or a hydrocarbon radical of 1 to 8 carbon atoms. The most preferred aldehyde is formaldehyde.

The isocyanate polymer may suitably be any organic isocyanate polymer compound containing at least 2 active isocyanate groups per molecule, or mixtures of such compounds. Generally, the isocyanate polymers employed in the method of this invention are those which have an isocyanato group functionality of at least about two. Preferably, this functionality ranges from 2.3 to 3.5 with an isocyanate equivalent of 132 to 135. The isocyanato functionality can be determined from the percent available NCO groups and the average molecular weight of the isocyanate polymer composition. The percent available NCO groups can be determined by the procedures of ASTM test method D1638.

The isocyanate polymers which can be employed in the method of the present invention can be those that are typically employed in adhesive compositions, including typical aromatic, aliphatic and cycloaliphatic isocyanate polymers. Representative aromatic isocyanate polymers include 2,4-tolylene diisocyanate, 2,6-tolylene diisocyanate, 4,4'-methylene bis(phenyl isocyanate), 1,3-phenylene diisocyanate, triphenylmethane triisocyanate, 2,4,4' triisocyanato-diphenyl ether, 2,4-bis(4-isocyanatobenzyl) phenylisocyanate and related polyaryl polyiscocyanates, 1,5-naphthalene diisocyanate and mixtures thereof.

Representative aliphatic isocyanate polymers include hexamethylene diisocyanate, xylylene diisocyanate, 1,12-dodecane diisocyanate and lysine ethyl ester diisocyanate. Representative cycloaliphatic isocyanate polymers include 4,4'-methylenebis (cyclohexyl isocyanate), 1,4-cyclohexylene diisocyanate, 1-methyl-2,4-cyclohexylene diisocyanate and 2,4-bis(4-isocyanatocyclhexylmethyl) cyclohexyl isocyanate.

Generally, when a phenol-formaldehyde resin is used as the phenolic resin it is present in an adhesive composition used in the method of the present invention within the range of about 50 to 90% by weight, preferably within the range of about 60 to 80% by weight of the total amount of adhesive. Generally, the isocyanate polymer is present in an amount of about 10% to 50% isocyanate polymer, preferably 20 to 40%, by weight. When the first adhesive bonding material is used according to these percentages, one achieves a commercially attractive combination of desired board properties and economic advantages. The amount of first adhesive material by which the lignocellulosic particles can be bonded together is preferably at least about 2% by weight, more preferably at least about 3% by weight preferably at least about 4% by weight, based on the weight of the mat.

The preferred formation of the layers of lignocellulosic material from lignocellulosic can involve the application of an adhesive bonding material to the lignocellulosic particles with subsequent application of heat and pressure to form the layers into its desired consolidated configuration. It should be appreciated that the first adhesive bonding material can be applied to the lignocellulosic particles in any conventional means, such as by spray coating of the adhesive bonding material onto the lignocellulosic particles.

Figure 9:
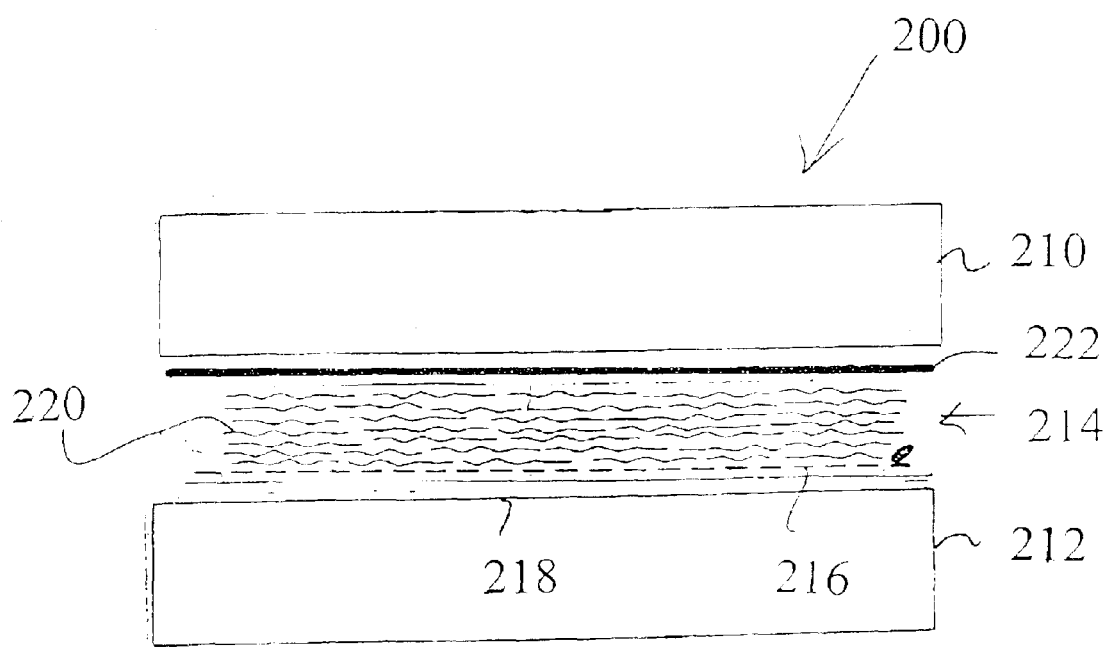
FIG. 9 is a schematic end view of product formation press 100.

In FIG. 9, for example, an end view of a product formation press system 200 is shown. The system 200 comprises an upper platen 210 and lower platen 212 defining therewithin a product formation press work space 214. A screen caul 216 is located on upper surface 218 of lower platen 212. The screen caul 216 supports a mat 220 comprising lignocellulosic particles and a first adhesive resin, as well as a radiant barrier material 222 located on the mat 220, during the heating and pressing thereof. The mat preferably comprises a plurality of layers of lignocellulosic material in which a multi-layer product is formed. The mat 220 and radiant barrier material 222 are bonded together by a second adhesive material, typically using heat and pressure, in the product formation press system 200.

In a typical method of this invention for forming a lignocellulosic substrate having a multi-layer structure, for example, a first layer of lignocellulosic particles and combined adhesive bonding material is generally laid down on a formation surface, such as a screen caul 216. A belt or screen can also be used as the formation surface. This first layer is termed a "face mix" and forms a face of the finished product.

Then, a second layer of lignocellulosic particles and adhesive bonding material is deposited in one or more steps. This second layer is termed a "core mix" since it will form the core of the finished product.

Following this, a third layer of lignocellulosic particles and adhesive is layed down on top of the core mix of the second layer. This third layer is also a. face mix and will form the opposite face of the finished product. The three layers which are deposited on the caul plate are termed the "mat."

The mat 220, radiant barrier material 222, and the screen caul 216 are then loaded into a formation press system 210. A pressing operation is carried out in order to form the desired product. During typical pressing operation, the mats are heated to an elevated temperature as they are being compressed. The exact conditions utilized in the pressing and heat curing of the mat can, of course, be easily selected by one skilled in the art depending, of course, upon the desired characteristics of the final product.

The preferred lignocellulosic substrate is an oriented, multilayer wood strand board which is composed of several layers of thin wood strands. Wood strands are wood particles having a length which is several times greater than their width. These strands are formed by slicing larger wood pieces so that the fiber elements in the strands are substantially parallel to the strand length. The strands in each layer are positioned relative to each other with their length in substantial parallel orientation and extending in a direction approaching a line which is parallel to one edge of the layer. The layers are positioned relative to each other with the oriented strands of adjacent layers perpendicular, forming a layer-to-layer cross-oriented strand pattern. Oriented, multilayer wood strand boards of the above-described type are described in detail in the following U.S. patents: U.S. Pat. No. 3,164,511, U.S. Pat. No. 4,364,984, U.S. Pat. No. 5,435,976, U.S. Pat. No. 5,470,631, U.S. Pat. No. 5,525,394, and U.S. Pat. No. 5,718,786, all of which are incorporated herein by reference. For example, in oriented strand board (OSB) mills, green lignocellosic material is flaked, dried, and blended with resins and wax, formed into mats, which are typically multi-layer in structure, and then pressed in continuous or multi-opening presses at relative high temperature and pressure.

Figure 2:
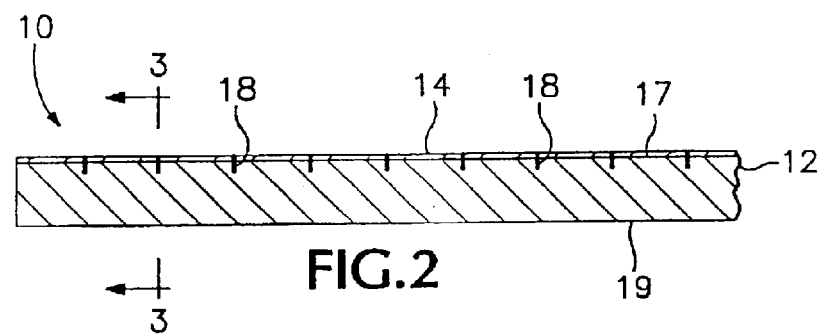
FIG. 2 is a sectional schematic view of the product of FIG. 1 taken along line 2—2.
Figure 3:
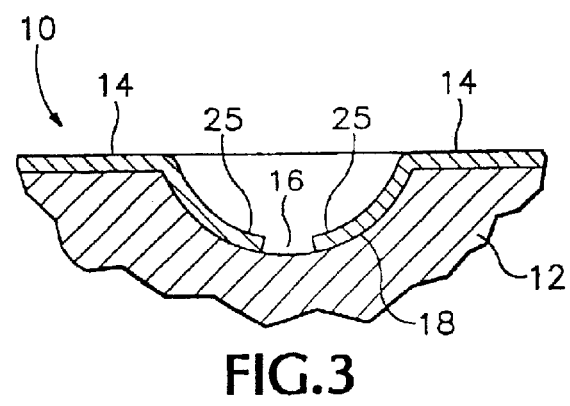
FIG. 3 is an enlarged sectional schematic view of the product of FIG. 2 taken along line 3—3 which depicts portions 25 of radiant barrier material 14 extending within the confines of aperture 18.
Figure 4:
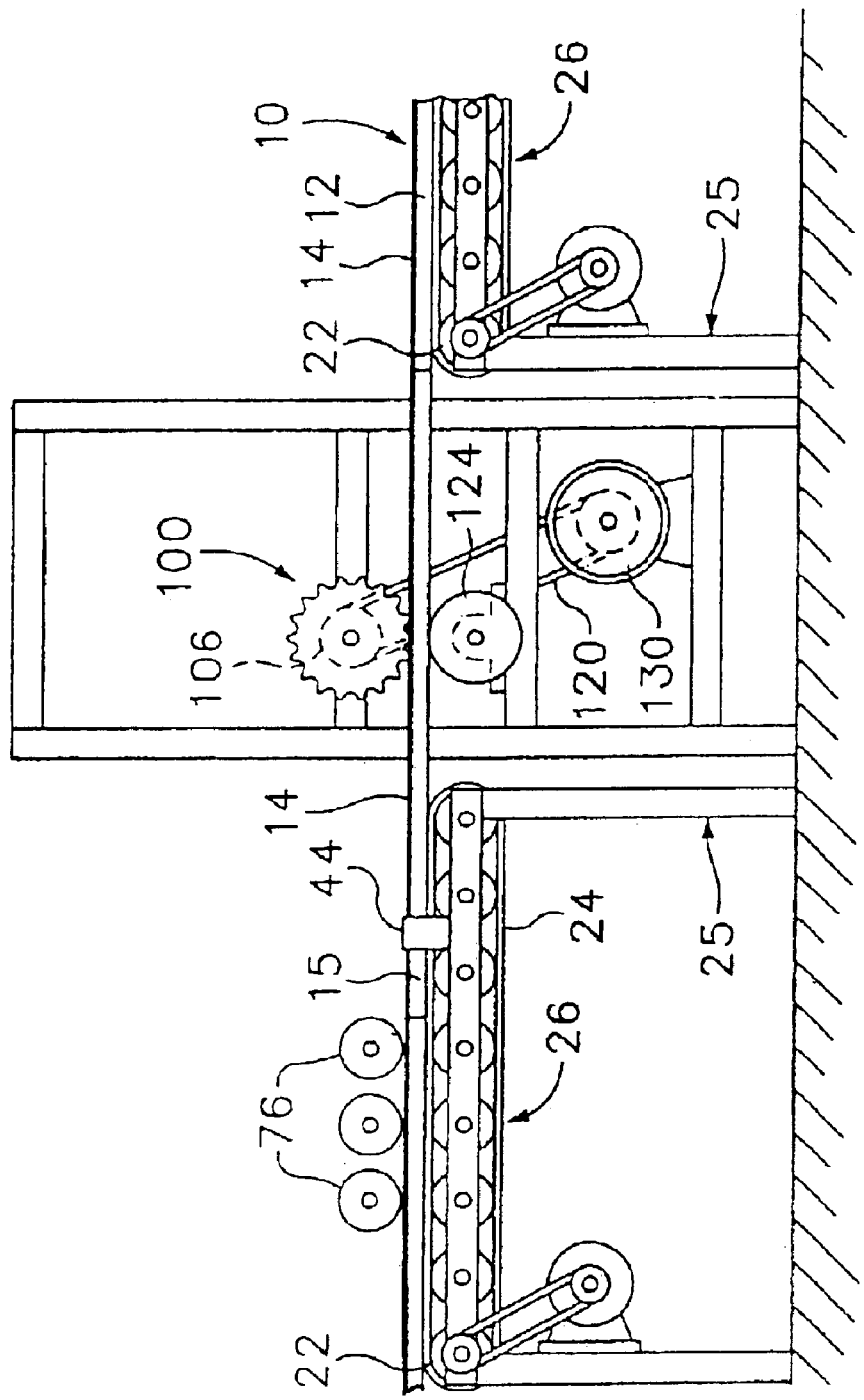
FIG. 4 is a schematic side elevation view of an exemplary system for producing apertures in product 10 of the present invention.

Referring now to FIGS. 1 and 2, a laminated product 10 of this invention is depicted in which a radiant barrier material 14 is laminated to a lignocellulosic substrate 12 to form a laminated radiant barrier covered underlying substrate 15. The underlying substrate 12 has outer surfaces 17 and 19. Radiant barrier material 14 is adhered to surface 17 of the underlying substrate 12. The radiant barrier material 14 can be a foil material, preferably metallic foil, and more preferably an aluminum foil material. Generally, the metallic foil of the radiant barrier material has a thickness of from about 0.00025" up to about 0.0010" in thickness. Radiant barrier material 14 can be pre-perforated prior to being adhered to surface 17 to allow the gaseous materials located between the radiant barrier material 14 and the surface 17 of the substrate 12 to be passed to the atmosphere surrounding the product 10.

Radiant barrier material 14 can also include a backing layer (not shown), such as a paper or a polymeric substrate. The paper substrate can comprise kraft paper or the like. The paper substrate is typically of a weight in the range of 30–70 pounds per ream (3000 ft$^2$).

The underlying substrate 12 is preferably chosen from a wide variety of structural or non-structural products which are commercially available. For example, the underlying substrate 12 can comprise the wood-based structural substrate described above.

The radiant barrier material 14 is generally adhered to underlying substrate 12 using a commercially available adhesive. For instance, a commercial polymeric material such as a water-based EVA glue, phenol-formaldehyde, or isocyanate material can be employed herein.

A plurality of apertures 18 are located in the radiant barrier covered product 15. This allows the composite product 10 to permit a substantial amount of moisture to pass from within the underlying substrate 12 into the surrounding atmosphere. The apertures 18, which are in the form of perforations, and preferably in the form of incisions, extend substantially completely through a radiant barrier material 14, and substantially completely through the outer major surface 17 (and a paper backing layer if it is provided), into the interstices of the underlying substrate 12. In this way the apertures 18 provide flow channels for escape of the moisture which exists within the interstices of the moisture-containing underlying substrate 12.

As shown in FIGS. 3–6, the radiant barrier material covered product 15 is formed into laminated product 10 by introducing a plurality of apertures 18, preferably in the form of incisions, which extend through both the radiant barrier material 14 and the outer surface 17 of the underlying substrate 12 employing a roll assembly 100. Roll assembly 100 comprises a cylindrical metal roll 104 having affixed to the metal roll outer surface 108 a plurality of rows of spaced apart teeth 102.

Figure 5:
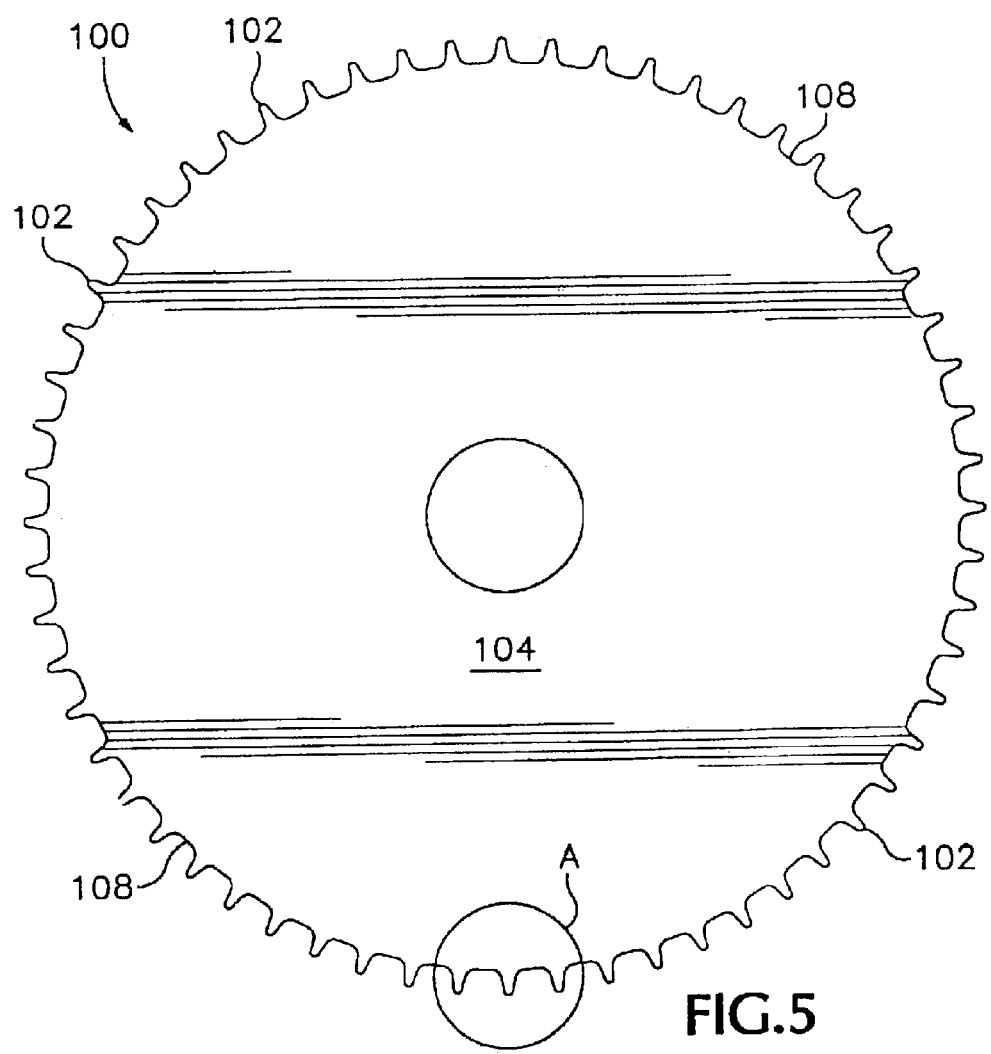
FIG. 5 is an enlarged schematic view of the apparatus 100 of FIG. 4 for introducing apertures into a radiant barrier material covered product.

The arrangement of the spaced apart teeth 102 contemplates attachment on roll surface 108 in a preferred predetermined pattern (see FIGS. 5 and 6) which is designed to produce a specific corresponding predetermined pattern of apertures 18 in the radiant barrier material covered product (see FIG. 1) resulting in a plurality of designatedly placed exit moisture flow channels. The detail of a preferred design of the teeth 102 is shown in FIG. 5. That design comprises teeth having outwardly-extending, inwardly-directed sides 112, which together form a curved outer tip 110. The teeth 102 are specifically designed for introducing apertures 18 into the radiant barrier material covered substrate 15 and for moving a portion of said radiant barrier material into the confines of said apertures. This is accomplished without subsequently picking a substantial amount of said radiant barrier material portion from within the confines of the apertures 18 when the teeth 102 exit the confines of the apertures 18. In this way the apertures 18 are at least partially filled with said radiant barrier material and a high reflectance level is maintained in the product 10.

The roll assembly 100 is rotatably supported on a pulley 106 which in turn is supported on a support frame (not shown) above table 21. The pulley 106 is coupled by a belt 120 to return roller 124 for driving roll assembly 100.

Underlying substrates 15 are continuously fed through the apparatus 20, each piece abutting the piece preceding and following it. The radiant barrier material covered underlying substrates 15 are pushed by the conveyer onto a gravity roller indicated generally at 80 from which they can be removed and subjected to an incising process, preferably prior to the adhesive material is fully cured. Alternatively, the incising step may be accomplished by stationing roll assembly 100 at the exit of the product formation press system or thereafter during the transporting and cutting of the radiant barrier material covered lignocellulosic substrate to produce a final-sized integral laminated product.

Figure 6:
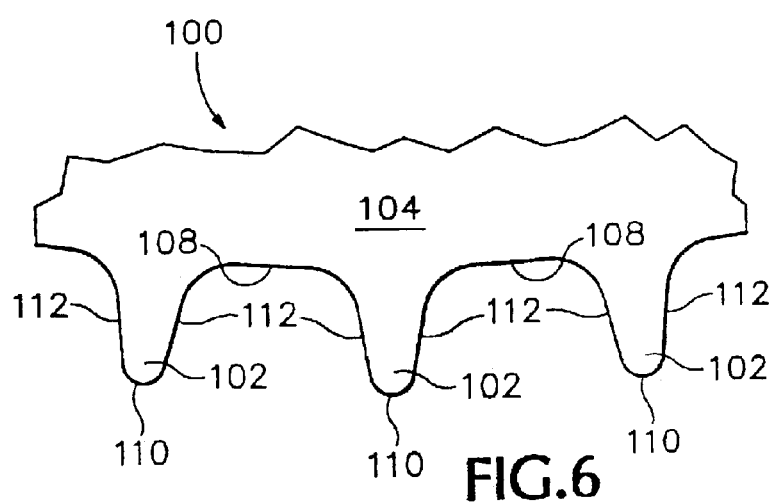
FIG. 6 is an enlarged detailed view of the portion of apparatus 100 encompassed within circular section A of FIG. 5.
Figure 7:
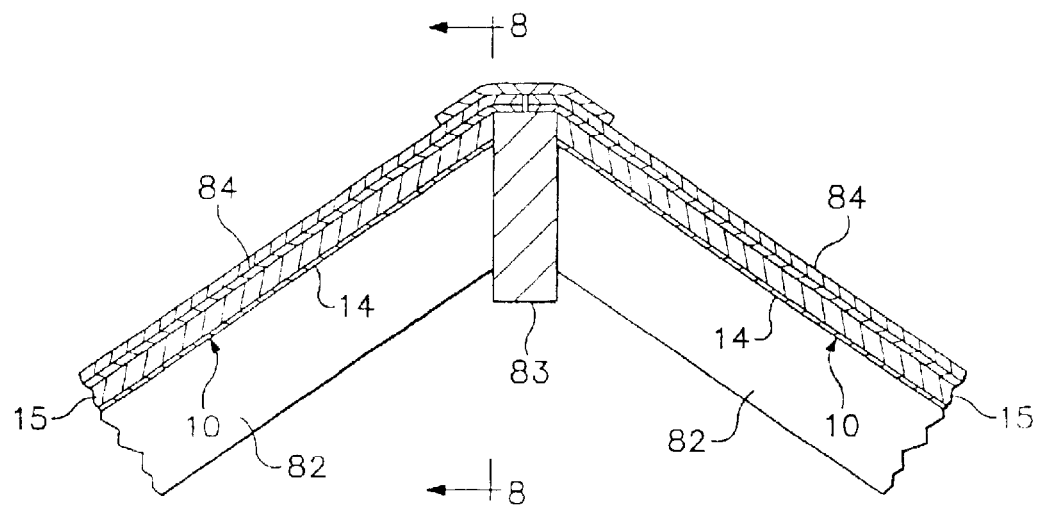
FIG. 7 is a sectional view of a typical roof structure incorporating decking material produced in accordance with the present invention.
Figure 8:
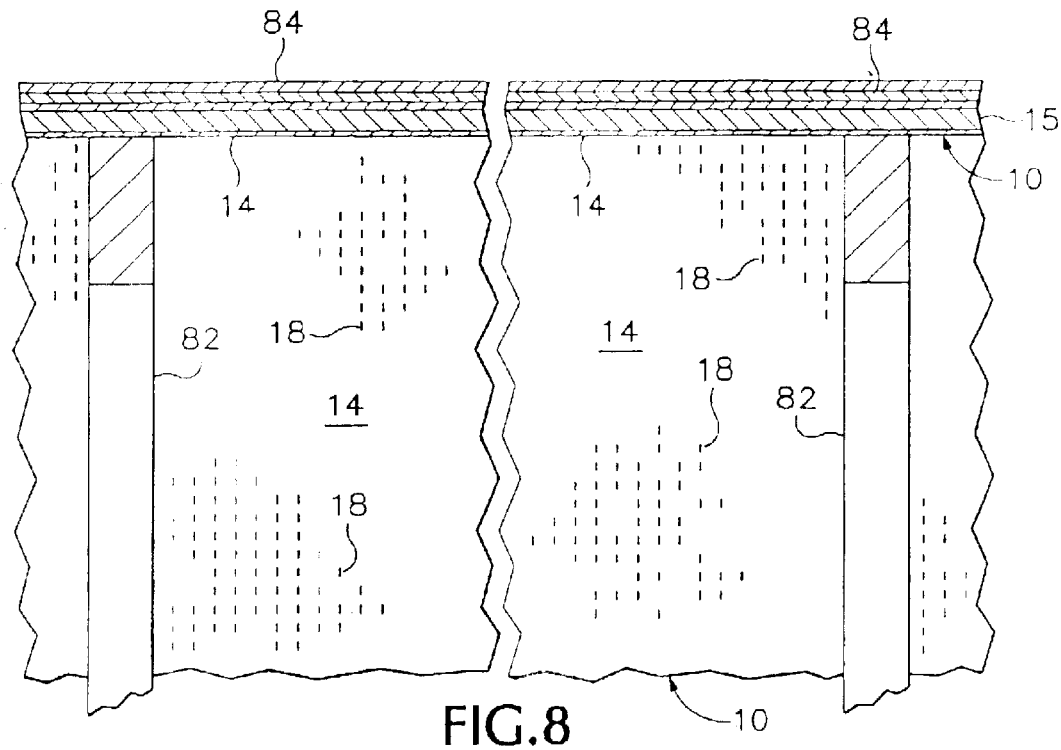
FIG. 8 is a sectional view taken along line 8—8 of FIG. 7 configuration.

FIGS. 6 and 7 show sectional views through a portion of a typical roof of a house employing the product 10 of the present invention. A plurality of rafters 82 extend between a ridge beam 83 or the like (not shown) and a top plate or hammer beam (not shown) in a conventional manner to form a support, usually sloping, for other roofing material. Sheets of product 10 are attached to those rafters. In accordance with this invention, product 10 is attached to the rafters so that the radiant barrier material 14 faces inwardly toward the attic or other space immediately below the roof structure. As described above, the substrate 15 is provided with exit flow channel to allow "maximum breathing" thereof. Tarpaper, shingles and other roofing material 84 is then attached to the outer surface of the product 10, as desired.

It is particularly important to recognize that the emissivity barrier side of the product 10 face inwardly and that its exposed surface, i.e., the downwardly facing surface opposite that attached to the underlying substrate, be uncovered and exposed to the air within the attic except, of course, in those small regions where it lies against the surfaces of the supporting rafters 82. In this fashion, the emissivity barrier acts as a low-emission radiator, transferring minimal energy by radiation into the attic space and reducing the attic temperature drastically from that existing when the underlying substrate 15 per se is used.

We claim:

1. A method for producing an integral laminated product which exhibits (a) a low level of emissivity and (b) a high level of moisture vapor permeability, and which enables trapped excess moisture to be transported from the product to the surrounding atmosphere while maintaining its effective radiant barrier properties, comprising the steps of:

providing lignocellulosic material;

treating said lignocellulosic material with a first adhesive bonding material;

forming a mat comprising a plurality of layers of said treated lignocellulosic material;

providing a radiant barrier material;

treating said mat comprising said plurality of layers of lignocellulosic material and/or said radiant barrier material with a second adhesive bonding material;

applying said radiant barrier material to an outer surface of said mat of treated lignocellulosic material to form a radiant barrier material covered mat of treated lignocellulosic material; and bonding together in situ said mat of lignocellulosic material with said first adhesive bonding material, and bonding said radiant barrier material to said mat of lignocellulosic material with said second adhesive material by curing said first adhesive bonding material and said second adhesive material, to form an integral laminated radiant barrier material covered lignocellulosic substrate; and introducing a plurality of apertures into said radiant barrier material prior to and/or subsequent to the formation of said radiant barrier material covered mat of treated lignocellulosic material.

2. The method of claim 1, wherein said lignocellulosic material comprises lignocellulosic particles.

3. The method of claim 1, wherein said layers of lignocellulosic material comprise lignocellulosic veneers.

4. The method of claim 1, wherein said second adhesive bonding material comprises at least one of an isocyanate polymer, an aldehyde resin, an aldehyde resin-latex copolymer, an isocyanate resin-latex copolymer, a polyolefin, a polyester, a vinyl acetate polymer, and a styrene-butadiene copolymer.

5. The method of claim 1, wherein said first and/or second adhesive bonding material comprises a liquid or a powder.

6. The method of claim 1, wherein said first adhesive bonding material and said second adhesive banding material each comprise the same adhesive bonding material.

7. The method of claim 1, wherein said bonding step is conducted at a temperature of at least about 140 degrees C.

8. The method, of claim 1, wherein said bonding step is conducted at a pressure of at least about 200 psi.

9. The method of claim 1, wherein said first adhesive bonding material and said second adhesive bonding material each comprise a different adhesive bonding material.

10. The method of claim 1, wherein the apertures are formed by the step of perforating said radiant barrier material covered product.

11. The method of claim 1, wherein the apertures are shaped in a substantially non-circular pattern.

12. The method of claim 1, which includes the step of minimizing the amount of said radiant barrier material which is removed from said product during forming of said apertures thereby maintaining said low level of emissivity of said product.

13. The method of claim 1, wherein the amount of trapped excess moisture which passes from said underlying substrate of said product into the surrounding atmosphere in a given period of time is at least about 35% of the amount of the amount of trapped excess moisture which passes in the same period of time from the underlying substrate per se.

14. The method of claim 1, wherein said apertures extend substantially completely through bath said radiant barrier material and said adhesive material thereby forming substantially completely open moisture vapor flow channels which create a high level of moisture vapor permeability through the radiant barrier material and the adhesive material thereby permitting a substantial amount of trapped excess moisture to pass from said underlying substrate into the surrounding atmosphere to avoid unwanted degradation of said underlying substrate, while maintaining said low level of emissivity of said product.

15. The method of claim 1, wherein said radiant barrier material includes a plurality of preformed apertures.

16. The method of claim 10, wherein perforations are formed by incising said radiant barrier material covered product.

17. The method of claim 15, wherein further apertures are formed by perforating said radiant barrier material covered product.

18. The method of claim 17, wherein the step of perforating said radiant barrier material covered product comprises incising said radiant barrier material covered product.

19. A method for producing an integral laminated product which exhibits (a) a low level of emissivity and (b) a high level of moisture vapor permeability, and which enables trapped excess moisture to be transported from the product to the surrounding atmosphere while maintaining its effective radiant barrier properties, comprising the steps of:

providing lignocellulosic material;

treating said lignocellulosic material with a first adhesive bonding material;

forming a mat comprising a plurality of layers of said lignocellulosic material;

providing a radiant barrier material;

treating said lignocellulosic material and/or said mat of said plurality of layers of lignocellulosic material and/or said radiant barrier material with a second adhesive bonding material;

applying said radiant barrier material to an outer surface of said mat of lignocellulosic material to form a radiant barrier material covered mat of lignocellulosic material; and bonding together in situ said mat of lignocellulosic material with said first adhesive bonding material, and said radiant barrier material to said mat of lignocellulosic material with said second adhesive bonding material by curing said first adhesive bonding material and said second adhesive material, to form an integral laminated radiant barrier material covered lignocellulosic substrate; and introducing a plurality of apertures into said laminated radiant barrier material covered substrate to form said integral laminated product, said apertures extending substantially completely through both said radiant barrier material and said second adhesive material thereby forming substantially completely open moisture vapor flow channels which create a high level of moisture vapor permeability through the radiant barrier material and the second adhesive bonding material thereby permitting a substantial amount of trapped excess moisture to pass from said underlying substrate into the surrounding atmosphere to avoid unwanted degradation of said underlying substrate, while maintaining said low level of emissivity of said product.

* * * * *

UNITED STATES PATENT AND TRADEMARK OFFICE
CERTIFICATE OF CORRECTION

PATENT NO. : 6,926,785 B2
APPLICATION NO. : 10/447681
DATED : August 9, 2005
INVENTOR(S) : Tanzar et al.

Page 1 of 1

It is certified that error appears in the above-identified patent and that said Letters Patent is hereby corrected as shown below:

Column 2, line 55, please replace "performed underlying" with --preformed underlying--
Column 4, line 67, please replace "treated-lignocellulosic material" with --treated lignocellulosic material--
Column 9, lines 21-23, please add --U.S. Pat. No. 3,164,511--
Column 12, line 15, please replace "completely through bath" with --completely through both--

Signed and Sealed this

Second Day of January, 2007

JON W. DUDAS
*Director of the United States Patent and Trademark Office*